(12) United States Patent
Peronti et al.

(10) Patent No.: US 9,706,869 B2
(45) Date of Patent: Jul. 18, 2017

(54) HAND OPERATED FRUIT SQUEEZER

(71) Applicants: Theresa Peronti, New York, NY (US);
Maryann Peronti, New York, NY (US)

(72) Inventors: Theresa Peronti, New York, NY (US);
Maryann Peronti, New York, NY (US); Harvey Levine, Fairfield, CT (US); Lawrence T. Levine, Easton, CT (US)

(73) Assignees: Theresa Peronti, New York, NY (US);
Maryann Peronti, New York, NY (US)

( * ) Notice: Subject to any disclaimer, the term of this patent is extended or adjusted under 35 U.S.C. 154(b) by 0 days.

(21) Appl. No.: 15/000,414

(22) Filed: Jan. 19, 2016

(65) Prior Publication Data

US 2016/0242587 A1    Aug. 25, 2016

Related U.S. Application Data

(63) Continuation of application No. 12/565,386, filed on Sep. 23, 2009, now Pat. No. 9,237,822.

(51) Int. Cl.
*A23N 1/00* (2006.01)
*A47J 19/02* (2006.01)

(52) U.S. Cl.
CPC .................. *A47J 19/022* (2013.01)

(58) Field of Classification Search
CPC ........ A47J 31/06; A47J 19/022; A47J 31/446; A47J 19/06; A47J 31/005; A47J 31/0626; A47J 19/005; A47J 19/00; B30B 9/3053; B30B 15/14

USPC .............. 100/112, 243, 250, 255, 265, 266; 99/323, 508
See application file for complete search history.

(56) References Cited

U.S. PATENT DOCUMENTS

| 67,010 | A | * | 7/1867 | Whitney et al. | ........ A47J 42/04 241/169.1 |
| 125,428 | A | * | 4/1872 | Amerling | ............... A47J 43/255 241/273.2 |
| 186,884 | A | * | 1/1877 | Scheibel | ............... A47J 43/255 241/273.2 |
| 207,974 | A | * | 9/1878 | McConnell | .......... A47J 37/0611 100/110 |
| 216,699 | A | * | 6/1879 | Reynolds | ............... A47J 19/022 100/213 |
| 240,858 | A | * | 5/1881 | Steber | ...................... B30B 9/32 100/232 |

(Continued)

*Primary Examiner* — Eric Stapleton
(74) *Attorney, Agent, or Firm* — Amster, Rothstein & Ebenstein LLP

(57) ABSTRACT

A fruit squeezer for squeezing juice picks up, squeezes and discards the squeezed fruit with use of a single hand. The squeezer has a first handle and a second handle that are rotatably connected to each other. Each handle has a top portion and a bottom portion. A biasing spring biases the top and bottom portions apart. A U-shaped jaw is fixed to the bottom end of the second handle. A pressing plate jaw is pivotally mounted to the bottom end of the first handle. Squeezing the top ends of the handles toward each other against the force of a spring moves the jaws for squeezing the fruit. A screen operatively connected to the handles simultaneously rotates at a second pivot axis from a rest position to a screening position below the fruit for screening solids from the squeezed juice.

3 Claims, 7 Drawing Sheets

(56) References Cited

U.S. PATENT DOCUMENTS

| | | | | |
|---|---|---|---|---|
| 248,930 A * | 11/1881 | Henis | B02C 1/00 | 241/169.2 |
| 386,694 A * | 7/1888 | Edie | B30B 9/32 | 100/232 |
| 576,706 A * | 2/1897 | Walker | A47J 19/022 | 99/507 |
| 581,526 A * | 4/1897 | Straube | B30B 15/08 | 100/213 |
| 620,047 A * | 2/1899 | Neal | B30B 15/08 | 100/125 |
| 637,521 A * | 11/1899 | Mitchel | A47J 43/255 | 241/273.2 |
| 694,617 A * | 3/1902 | Coomber | A47J 19/022 | 100/213 |
| 751,159 A * | 2/1904 | Gage | A47J 42/34 | 241/169 |
| 774,217 A * | 11/1904 | Welke | A47J 43/25 | 241/273.1 |
| 933,917 A * | 9/1909 | Norwood | A47J 31/02 | 383/72 |
| 1,026,696 A * | 5/1912 | Nemes | B30B 9/3064 | 100/228 |
| 1,115,754 A * | 11/1914 | Walker | A47J 19/022 | 99/507 |
| 1,411,813 A * | 4/1922 | Stein | A47J 19/022 | 99/508 |
| 1,420,933 A * | 6/1922 | Liebelt | A47J 19/005 | 241/88.1 |
| 1,427,898 A * | 9/1922 | Himelfarb | A47J 43/26 | 30/258 |
| 1,620,551 A * | 3/1927 | Hughes | A23N 1/003 | 99/504 |
| 1,652,053 A * | 12/1927 | Samson | A47J 19/00 | 241/89.3 |
| 1,661,374 A * | 3/1928 | Lacey | A47J 19/022 | 100/211 |
| 1,682,274 A * | 8/1928 | Gussner | A47J 19/022 | 30/123.6 |
| 1,697,618 A * | 1/1929 | Strite | A47J 19/022 | 99/503 |
| 1,702,737 A * | 2/1929 | MacDonald | A47J 19/022 | 222/192 |
| 1,726,544 A * | 9/1929 | De Simone | A47J 19/022 | 100/126 |
| 1,753,693 A * | 4/1930 | Carpenter | A47J 19/005 | 241/89.3 |
| 1,762,031 A * | 6/1930 | Roberts | A47J 19/022 | 100/125 |
| 1,771,503 A * | 7/1930 | Merzoian | A47J 19/022 | 99/507 |
| 1,817,946 A * | 8/1931 | Simon | B30B 9/02 | 100/217 |
| 1,834,097 A * | 12/1931 | Gum | A23N 1/003 | 12/146 BP |
| 1,886,250 A * | 11/1932 | Bungay | A47J 19/022 | 100/126 |
| 1,888,915 A * | 11/1932 | Fromm | A47J 19/022 | 99/485 |
| 1,904,328 A * | 4/1933 | Rice | B67B 3/10 | 100/257 |
| 1,910,559 A * | 5/1933 | Morin | A47J 19/022 | 100/126 |
| 1,938,463 A * | 12/1933 | Roberts | A47J 19/022 | 100/125 |
| 1,941,164 A * | 12/1933 | Ciampa | A47J 19/022 | 99/508 |
| 1,949,675 A * | 3/1934 | Bush | A47J 19/02 | 99/507 |
| 1,950,547 A * | 3/1934 | Fitzpatrick | A47J 19/022 | 100/131 |
| 1,971,657 A * | 8/1934 | Quam | A47J 19/022 | 99/485 |
| 2,004,056 A * | 6/1935 | Pipkin | A23L 27/13 | 100/112 |
| 2,018,181 A * | 10/1935 | Leo | A47J 19/005 | 100/123 |
| 2,051,095 A * | 8/1936 | Mantelet | A47J 19/005 | 241/86 |
| 2,057,227 A * | 10/1936 | Blum | A47J 19/022 | 99/485 |
| 2,069,754 A * | 2/1937 | Finizie | A47J 19/022 | 100/126 |
| 2,070,137 A * | 2/1937 | Mantelet | A47J 19/005 | 241/82.5 |
| 2,087,979 A * | 7/1937 | Kennedy | A47J 19/022 | 99/505 |
| 2,099,170 A * | 11/1937 | Majewski, Jr. | A47J 19/022 | 99/507 |
| 2,117,687 A * | 5/1938 | Stanton | A47J 19/022 | 100/126 |
| 2,142,975 A * | 1/1939 | Majewski, Jr. | A47J 19/022 | 100/125 |
| 2,151,500 A * | 3/1939 | Cecil | A47J 19/022 | 100/131 |
| 2,160,523 A * | 5/1939 | Scurlock | A47J 19/022 | 241/276 |
| 2,162,922 A * | 6/1939 | Schmidt | A01F 25/16 | 100/265 |
| 2,176,377 A * | 10/1939 | Gamble | A47J 43/22 | 222/192 |
| 2,184,356 A * | 12/1939 | Lindgren | B30B 1/261 | 100/231 |
| 2,212,328 A * | 8/1940 | Scurlock | A47J 19/022 | 99/497 |
| 2,216,710 A * | 10/1940 | Lindgren | B21D 28/002 | 100/231 |
| 2,220,458 A * | 11/1940 | Osterman | A47J 19/022 | 100/125 |
| 2,238,571 A * | 4/1941 | Scott | A47J 19/022 | 100/125 |
| 2,265,409 A * | 12/1941 | Verbrugge | A47J 19/022 | 100/126 |
| 2,291,028 A * | 7/1942 | Cummins | A47J 19/022 | 99/485 |
| 2,443,129 A * | 6/1948 | Binzel | A47J 19/022 | 99/507 |
| 2,452,638 A * | 11/1948 | Drum | D06B 15/10 | 100/116 |
| 2,495,948 A * | 1/1950 | Taylor | A47J 19/00 | 241/248 |
| 2,497,335 A * | 2/1950 | Wissner | A47J 19/022 | 100/125 |
| 2,507,963 A * | 5/1950 | Davitcho | A47J 19/022 | 99/502 |
| 2,601,606 A * | 6/1952 | Goldstein | A47J 19/022 | 100/125 |
| 2,674,182 A * | 4/1954 | Kirkpatrick | A47J 19/022 | 100/238 |
| 2,724,326 A * | 11/1955 | Long | A47J 19/022 | 100/234 |
| 2,753,904 A * | 7/1956 | Trainor | A23N 1/003 | 74/23 |
| 2,786,502 A * | 3/1957 | Turner | A47J 17/16 | 100/213 |
| 2,856,846 A * | 10/1958 | Belk | A47J 19/02 | 100/108 |
| 2,906,195 A * | 9/1959 | Zysset | A47J 19/022 | 100/125 |
| 3,101,758 A * | 8/1963 | Carroll | A47J 19/022 | 99/503 |
| 3,103,239 A * | 9/1963 | Alexander | A23N 1/003 | 100/105 |
| 3,116,682 A * | 1/1964 | MacKenzie | A23N 1/00 | 100/112 |
| 3,126,818 A * | 3/1964 | Koelsch | B30B 9/121 | 100/112 |
| 3,162,114 A * | 12/1964 | Quiroz | A23L 2/06 | 100/108 |

(56) References Cited

U.S. PATENT DOCUMENTS

| | | | | |
|---|---|---|---|---|
| 3,195,598 A * | 7/1965 | Koch | A47J 19/00 | 241/168 |
| 3,247,875 A * | 4/1966 | Richner | A47J 19/005 | 241/89.2 |
| 3,269,301 A * | 8/1966 | Krause | A23N 1/003 | 100/108 |
| 3,272,116 A * | 9/1966 | White | A23N 1/003 | 100/112 |
| 3,327,621 A * | 6/1967 | Zysset | A47J 19/02 | 100/125 |
| 3,364,721 A * | 1/1968 | Criblez | B21D 45/00 | 72/345 |
| 3,502,275 A * | 3/1970 | Watson | E02D 1/02 | 100/233 |
| 3,566,939 A * | 3/1971 | Hubrich | B27L 1/127 | 99/501 |
| 4,069,752 A * | 1/1978 | Ahner | A47J 19/06 | 100/112 |
| 4,106,401 A * | 8/1978 | Ackeret | A47J 19/022 | 99/506 |
| 4,125,064 A * | 11/1978 | Ackeret | A47J 19/022 | 99/505 |
| 4,157,062 A * | 6/1979 | Ackeret | A47J 19/02 | 100/112 |
| 4,201,130 A * | 5/1980 | Stahl | B30B 1/08 | 100/231 |
| 4,208,961 A * | 6/1980 | Okajima | B30B 9/323 | 100/218 |
| 4,235,164 A * | 11/1980 | Allen | B30B 9/321 | 100/127 |
| 4,348,950 A * | 9/1982 | Harris | A47J 19/06 | 100/116 |
| 4,397,744 A * | 8/1983 | Haruo | B01D 25/322 | 100/112 |
| 4,405,457 A * | 9/1983 | Busse | B01D 25/172 | 100/112 |
| 4,506,601 A * | 3/1985 | Ramirez | A47J 19/027 | 99/511 |
| 4,531,457 A * | 7/1985 | Sivaslian | A47J 19/022 | 100/234 |
| 4,572,445 A * | 2/1986 | Cristante | A47J 19/027 | 241/273.3 |
| 4,711,167 A * | 12/1987 | Sano | A47J 19/022 | 241/169.1 |
| 4,871,449 A * | 10/1989 | Lott | B01D 21/0012 | 100/112 |
| 4,937,088 A * | 6/1990 | Gosselin | A23N 4/18 | 426/481 |
| 4,977,826 A * | 12/1990 | Kock | A23N 1/003 | 99/516 |
| 4,981,220 A * | 1/1991 | Kolodesh | A23N 1/003 | 209/691 |
| 5,064,671 A * | 11/1991 | Kock | A23N 1/003 | 426/481 |
| 5,101,720 A * | 4/1992 | Bianchi | A47J 19/06 | 100/112 |
| 5,163,362 A * | 11/1992 | Gaber | A47J 19/005 | 100/112 |
| 5,165,334 A * | 11/1992 | Aluotto | B30B 9/321 | 100/112 |
| 5,165,335 A * | 11/1992 | Bianchi | A47J 19/06 | 100/112 |
| 5,182,984 A * | 2/1993 | Wagner | A23N 1/003 | 100/108 |
| 5,193,447 A * | 3/1993 | Lucas | A47J 19/02 | 99/506 |
| 5,219,006 A * | 6/1993 | Bishop | A47J 19/005 | 141/1 |
| 5,249,515 A * | 10/1993 | Bachmann | A23N 1/003 | 99/501 |
| 5,249,516 A * | 10/1993 | Pastor | A23N 1/003 | 99/495 |
| 5,263,408 A * | 11/1993 | Blanchet | B30B 9/04 | 100/125 |
| 5,277,109 A * | 1/1994 | Muench | B30B 9/047 | 100/112 |
| 5,333,352 A * | 8/1994 | McDonald, Jr. | D06F 47/02 | 100/112 |
| 5,463,941 A * | 11/1995 | Gibson | A47J 19/06 | 100/112 |
| 5,467,699 A * | 11/1995 | Laib | A47J 19/06 | 100/112 |
| 5,510,028 A * | 4/1996 | Kuhlman | A47J 43/284 | 210/307 |
| 5,513,562 A * | 5/1996 | Moor | A47J 19/06 | 100/112 |
| 5,520,104 A * | 5/1996 | Ancona | A47J 19/06 | 100/112 |
| 5,546,785 A * | 8/1996 | Platt | B21D 51/26 | 100/282 |
| 5,735,193 A * | 4/1998 | Chang | A47J 43/06 | 241/282.1 |
| 5,865,095 A * | 2/1999 | Mulle | A47J 31/0573 | 99/286 |
| 5,924,636 A * | 7/1999 | Calderon | A61J 7/0007 | 241/169 |
| 5,970,859 A * | 10/1999 | Lee | A47J 19/022 | 99/506 |
| 6,070,519 A * | 6/2000 | Sham | A47J 19/02 | 99/348 |
| 6,138,556 A * | 10/2000 | Yu | A47J 19/027 | 99/501 |
| 6,155,164 A * | 12/2000 | Egana | A47J 19/022 | 100/125 |
| 6,196,122 B1 * | 3/2001 | Lai | A47J 19/022 | 100/110 |
| 6,318,252 B1 * | 11/2001 | Kao | A47J 19/022 | 100/125 |
| 6,321,644 B1 * | 11/2001 | Kao | A47J 19/025 | 100/125 |
| 6,347,580 B1 * | 2/2002 | Huang | A47J 19/022 | 99/501 |
| 6,382,090 B1 * | 5/2002 | Kokkinos | A47J 19/06 | 100/112 |
| 6,409,107 B1 * | 6/2002 | Romano | A47J 43/25 | 241/168 |
| 6,543,344 B1 * | 4/2003 | Settele | A47J 19/06 | 100/110 |
| 6,553,899 B1 * | 4/2003 | Kao | A47J 19/022 | 99/506 |
| 6,561,084 B2 * | 5/2003 | Lane | A47J 43/284 | 100/116 |
| 6,564,705 B2 * | 5/2003 | Zarlengo | A47J 19/005 | 100/245 |
| D493,074 S * | 7/2004 | Brousseau | A47J 19/005 | D7/678 |
| 6,813,996 B1 * | 11/2004 | Kao | A47J 19/022 | 99/506 |
| 6,966,256 B2 * | 11/2005 | Canizares | B30B 9/04 | 100/126 |
| 6,974,098 B2 * | 12/2005 | Keller | A47J 19/06 | 100/112 |
| 7,000,535 B2 * | 2/2006 | Harrison-Griffin | A47J 19/06 | 100/126 |
| 7,028,606 B2 * | 4/2006 | Basora | A47J 19/025 | 99/501 |
| 7,117,785 B2 * | 10/2006 | Walker, III | A47J 19/06 | 100/112 |
| 7,219,600 B1 * | 5/2007 | Haven | A47J 31/20 | 99/318 |
| 7,267,050 B2 * | 9/2007 | Durris | A47J 19/027 | 100/213 |
| 7,296,762 B2 * | 11/2007 | Dorion | A47J 19/06 | 241/169 |
| 7,299,747 B2 * | 11/2007 | So | A47J 19/005 | 100/110 |
| 7,320,274 B2 * | 1/2008 | Castellani | A47J 31/0673 | 99/289 R |

(56) References Cited

U.S. PATENT DOCUMENTS

| | | | | |
|---|---|---|---|---|
| 7,337,714 | B2* | 3/2008 | Mazzer | A47J 31/404 100/126 |
| 7,445,439 | B2* | 11/2008 | Wohlrab | B29C 45/66 100/282 |
| 7,637,445 | B2* | 12/2009 | So | A47J 43/255 241/169.1 |
| 7,648,092 | B2* | 1/2010 | Wong | A47J 43/25 100/234 |
| 8,701,548 | B2* | 4/2014 | Denisart | A47J 31/3676 99/289 R |
| 2001/0032552 | A1* | 10/2001 | Egana | A47J 19/022 100/213 |
| 2002/0148356 | A1* | 10/2002 | Lazaris | A47J 31/0668 99/295 |
| 2003/0005832 | A1* | 1/2003 | Wang | A47J 19/022 100/213 |
| 2003/0056655 | A1* | 3/2003 | Kollep | A47J 31/46 99/295 |
| 2004/0074403 | A1* | 4/2004 | Canizares | B30B 9/04 100/234 |
| 2005/0284309 | A1* | 12/2005 | de Groote | A47J 17/18 99/508 |
| 2007/0119314 | A1* | 5/2007 | Acker | A47J 19/06 100/126 |
| 2007/0215729 | A1* | 9/2007 | Wong | A47J 43/25 241/94 |
| 2008/0028943 | A1* | 2/2008 | Lee | G07F 13/00 99/282 |
| 2008/0105131 | A1* | 5/2008 | Castellani | A47J 31/0673 99/295 |
| 2010/0258010 | A1* | 10/2010 | Castellani | A47J 31/0673 99/295 |

* cited by examiner

HAND OPERATED FRUIT SQUEEZER

RELATED APPLICATIONS

This application is a continuation of pending U.S. patent application Ser. No. 12/565,386 filed on Sep. 23, 2009, which is to issue as U.S. Pat. No. 9,237,822 on Jan. 19, 2016—the contents of which are incorporated by reference herein.

FIELD AND BACKGROUND OF THE INVENTION

The present invention relates generally to a culinary device, and more specifically, a fruit squeezer that is operated with a single hand.

It is well-known that juice from citrus fruits, such as lemons, limes and oranges, is used as an ingredient for recipes for sauces, glazes, marinades, salad dressings, custards, and into baking ingredients. The juice is typically squeezed from a sliced portion of the fruit by hand into a bowl or cup or over a fully prepared platter of food.

However, squeezing juice from fruit by hand is often difficult, time-consuming and messy and can result in unsqueezed juice remaining in the fruit.

In addition, squeezing fruit by hand may cause bacteria, germs and dirt particles to contaminate the juice if hands were not properly cleaned.

Further, squeezing a fruit by hand often results in fruit pulp and pits also being squeezed from the fruit and falling into the food or beverage which then requires the additional step of removing these elements from the juice.

Prior art fruit squeezers have attempted to resolve these issues. However, these prior art fruit squeezers often require two hands to manipulate.

Accordingly, there is still a need for a fruit squeezer that squeezes juice from a fruit in a quick, clean manner with the use of only one hand.

SUMMARY OF THE INVENTION

It is an object of the present invention to provide a fruit squeezer that can be operated with only one hand.

It is a further object of the invention to provide a fruit squeezer that directly picks up the fruit without having to use a hand to place the fruit inside the fruit squeezer.

It is still another object of the invention to provide a fruit squeezer having a mechanism that automatically moves a screen from a rest position to a second position beneath the squeezed fruit to collect any pulp and/or pits squeezed from the fruit, during the squeezing and returns the screen to the rest position after the squeezing.

Still another object of the invention is to provide a fruit squeezer having a mechanism for automatically wiping the pulp and/or pits off of the screen when the screen returns to the rest position.

Accordingly, the squeezer of the subject invention comprises a first handle having a top portion with a top end and a bottom portion with a bottom end and a second handle having a top portion with a top end and a bottom portion with a bottom end. The second handle is rotatably connected to the first handle at a crossing location between the handles at a first pivot axis.

A biasing spring is connected between the first and second handles for biasing the top and bottom portions of the handles apart and against a squeezing force that is applied to move the top portions of the handles together and the bottom portions of the handles together.

The squeezer includes a pair of jaws. One of the jaws is U-shaped to embrace a piece of fruit and is fixed to the bottom end of the second handle. The other jaw is in the form of a pressing plate that is pivotally mounted to the bottom end of the first handle. The pressing plate moves from a rest downward facing position to a folded position, wherein the pressing plate is positioned between the arms of the U-shaped jaw. With the item to be squeezed between the pressing plate and the base of the U-shaped jaw, the top ends of the handles are pushed together to move the bottom ends of the handles together, as well, to squeeze the item.

The jaws together thus form a clamping structure which is actuated by squeezing the top ends of the first and second handles together. The biasing spring resists the squeezing action and hence, causes the jaw members to rest in an open, spaced apart position.

A screen is attached to the fruit squeezer by a screen arm which connects to a screen disk or crank mounted on an arm of the U-shaped jaw. The screen disk or crank rotates at a second pivot axis and facilitates rotation of the screen arm and hence the screen to a screening position below a piece of fruit to be squeezed between the jaws for screening solids from liquids squeezed from the item, and then back to its rest position.

In addition, the squeezer of the invention has a linkage connected between the top end of the first handle and the crank for rotating the crank and thus pivoting the screen from its rest to its screening position, as the top ends of the handles are squeezed together by a user of the device.

The biasing spring biases the top portions of the handles apart and, through the linkage, rotates the crank in an opposite direction to move the screen from the screening to the rest position when the top portions of the handles are released.

Accordingly, the invention is designed so that it can be fully operated by one hand, to perform the following steps: (i) pick up and hold a piece of fruit; (ii) squeeze the piece of fruit to extract its juice; (iii) rotate a screen below the piece of fruit to collect pulp and/or pits from the squeezed fruit; (iv) wipe the pulp and/or pits off of the screen; and (v) release the squeezed piece from the fruit squeezer, all without touching the fruit with hands.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
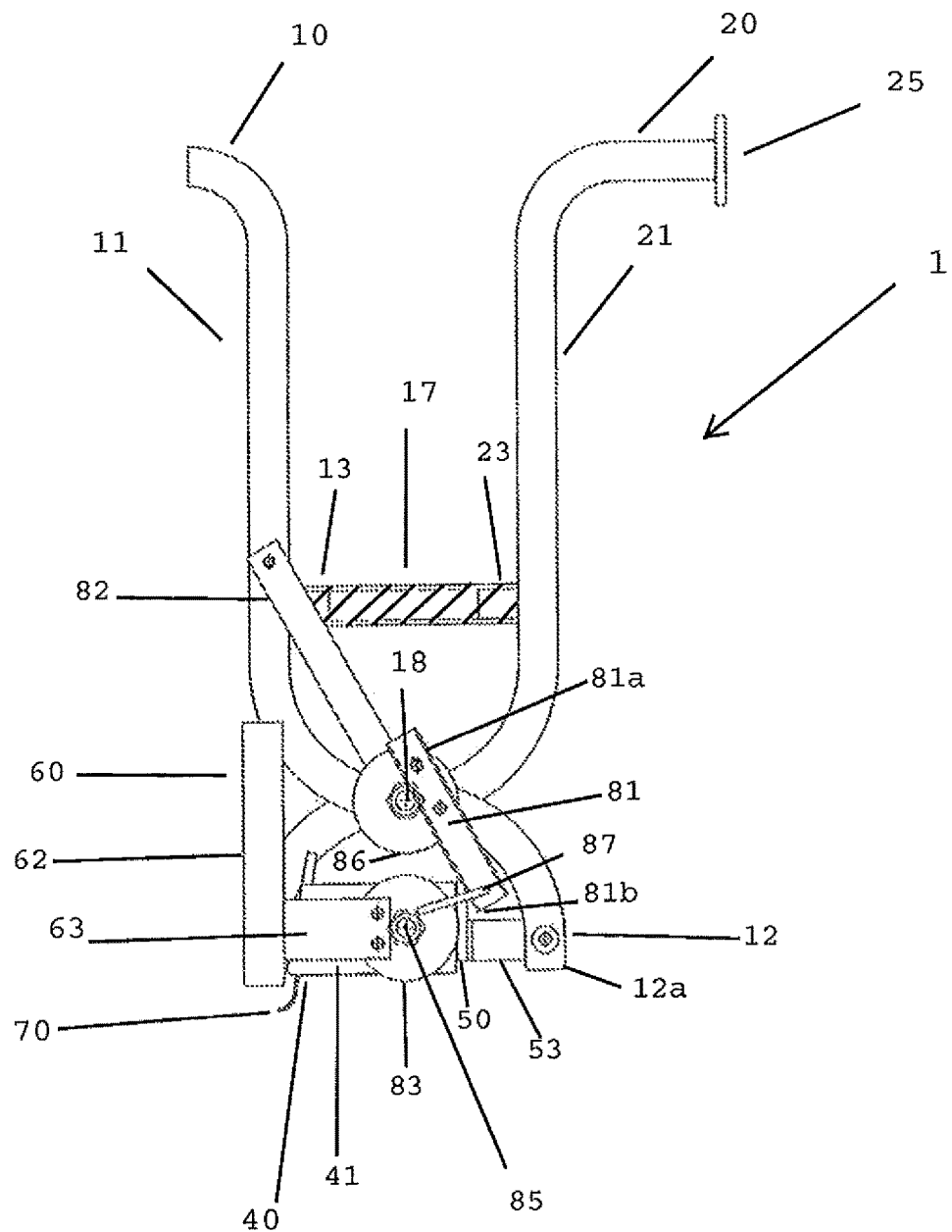
FIG. 1 is a front plan view of the inventive squeezer in an initial squeezing position.

Referring to the drawings, in which like reference numerals are used to refer to the same or functionally similar parts, the invention is a hand operated fruit squeezer (referenced generally in the drawings as 1), as shown in FIGS. 1, 2, 3, 4 and 7 that generally comprises a first handle 10 and a second handle 20 which are pivotally connected to each other at a first pivot axis 18, a U-shaped jaw 40 which is connected to a bottom end 22a of the second handle 20, a pressing plate jaw 50 which is pivotally connected to a bottom end 12a of the first handle 10, a screen 60 which is pivotally mounted at a second pivot axis to the U-shaped jaw 40 and a link assembly that moves the screen from a rest position to a screening position for catching seeds and pulp from the squeezed fruit upon actuating the handles 10, 20.

Figure 2:
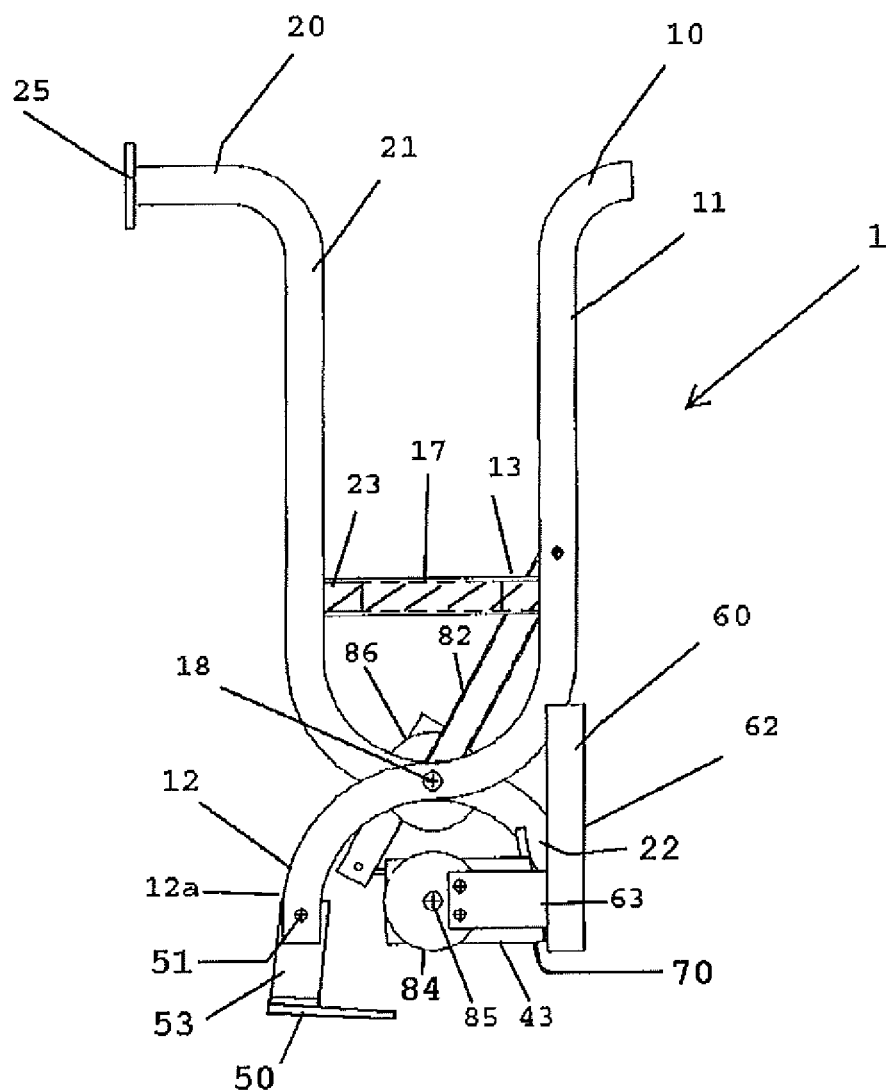
FIG. 2 is a rear plan view of the inventive squeezer in a rest position.

FIG. 2 shows the squeezer 1 in a rest position where no fruit is between the jaws 40, 50 and the pressing plate jaw 50 pivots downward from the bottom portion 12 of the first handle 10.

FIG. 1 shows the squeezer 1 in an initial squeezing position where the fruit (not shown) is between the jaws 40, 50 but the top portions 11, 21 of the handles 10, 20 have not yet been squeezed.

Figure 7:
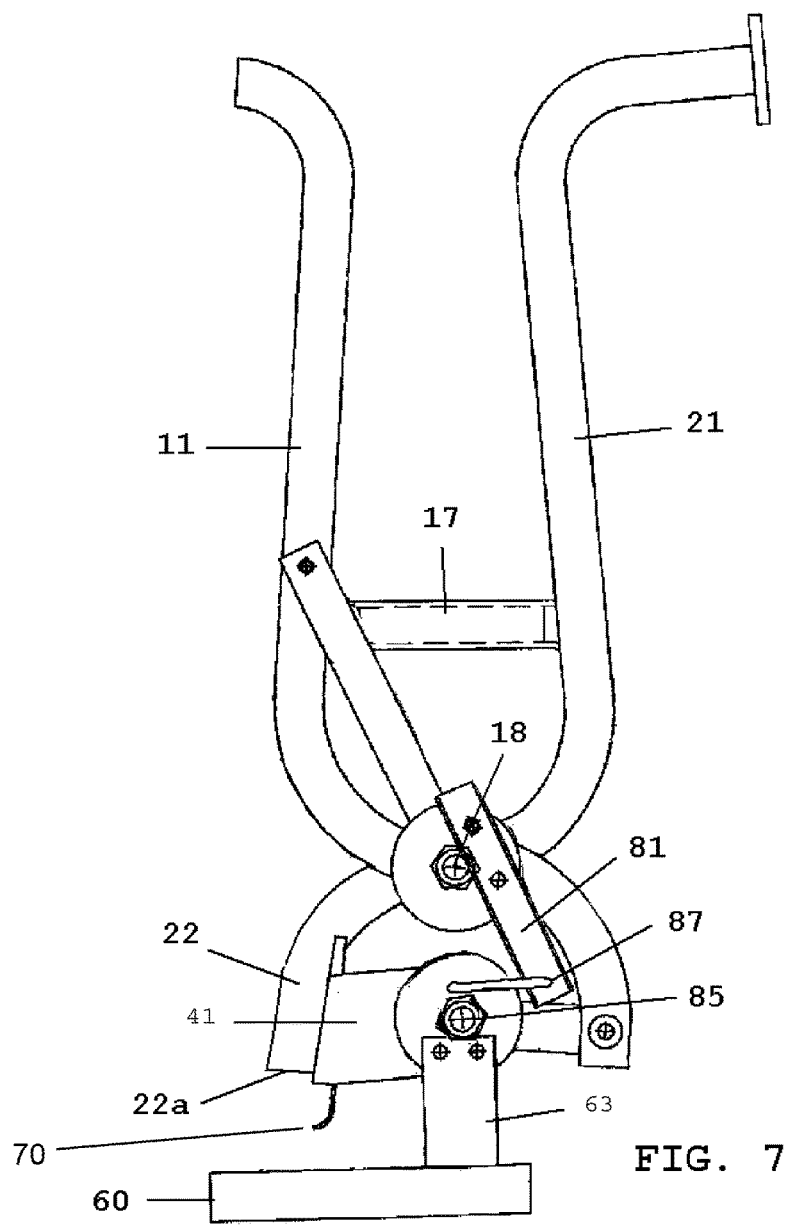
FIG. 7 is a front plan view of the inventive squeezer in a squeezing position.

FIG. 7 shows the squeezer 1 in a squeezing position where the top portions 11, 21 of the handles 10, 20 are squeezed toward each other and the screen 60 has moved from a rest position to a screening position.

The handles 10, 20 have a top portion 11, 21 and a bottom portion 12, 22. The second handle 20 is rotatably connected to the first handle 10 at a crossing location at a first pivot axis 18, shown in FIG. 3, that is intermediate the top portions 11, 21 and bottom portions 12, 22 and at the first pivot axis.

A central pin 15 pivotally connects the handles 10, 20 to each other. The handles 10, 20 have corresponding openings (not shown) that receive the central pin 15. The central pin 15 has opposite ends with threads. Nuts 16 engage the threads and maintain the handles 10, 20 in their relative position on the central pin 15.

The top portions 11, 21 of the handles 10, 20 generally comprise the handle part above the pin 15, while the bottom portions 12, 22 generally comprise the handle part below the pin 15. The top portions 11, 21 are preferably longer than the bottom portions 12, 22. A longer top handle portion provides increased force and leverage for squeezing the fruit.

The top ends of the handles 10, 20 are slightly curved outward. The curvature of the handles 10, 20 prevent slippage of the squeezer 1 from the user's hand. The handles 10, 20 can also have a non-slip covering, such as a thin rubber film.

A hand disk 25 is attached to the end of the second handle 20 to further guard against the user's hand from sliding off the handle 20.

A spring 17 is connected to the top portions of the handles 10, 20. The spring 17 has opposite ends that engage projections 13, 23 on the handles 10, 20 to maintain the spring 17 properly oriented with respect to the handles. Alternatively, the ends of the spring 17 sit in holes (not shown) in the inner face of the handles 10, 20. The spring 17 biases the top portions 11, 21 and bottom portions 12, 22 of the handles 10, 20 apart when the fruit squeezer 1 is in its rest position. The spring 17 also provides a slight resistance to the hand force when the handles 10, 20 are moved toward each other.

Figure 3:
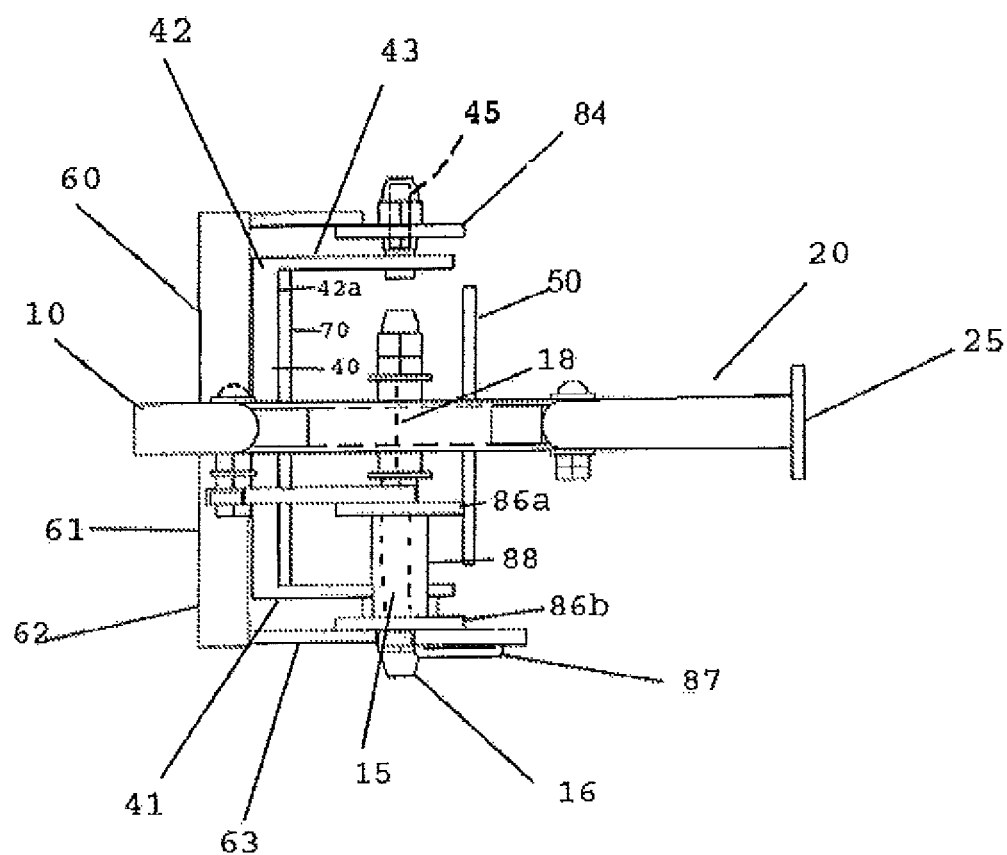
FIG. 3 is a top plan view of the inventive squeezer in an initial squeezing position.

The U-shaped jaw 40 is affixed to the bottom portion 22 of the second handle 20 by a connector, such as a screw and nut. Alternatively, the U-shaped jaw 40 and the second handle can comprise a unitary part. It is not necessary that the jaw 40 have a U-shape, as long as the shape of jaw 40 fully or partially encloses the food item while squeezing. As shown in FIG. 3, the U-shaped jaw 40 includes arms 41, 43 and a base 42. The arms 41, 43 and base 42 have flat surfaces that collectively form a space for receiving the food item. The arms 41 and 43 are parallel and extend from opposite side edges of the base 42. The base 42 has an inner side 42a that faces the fruit.

As shown in FIG. 2, the U-shaped jaw 40 and the pressing plate jaw 50 are spaced from each other when the squeezer 1 is in the rest position and there is no fruit between the jaws 40, 50.

Figure 4:
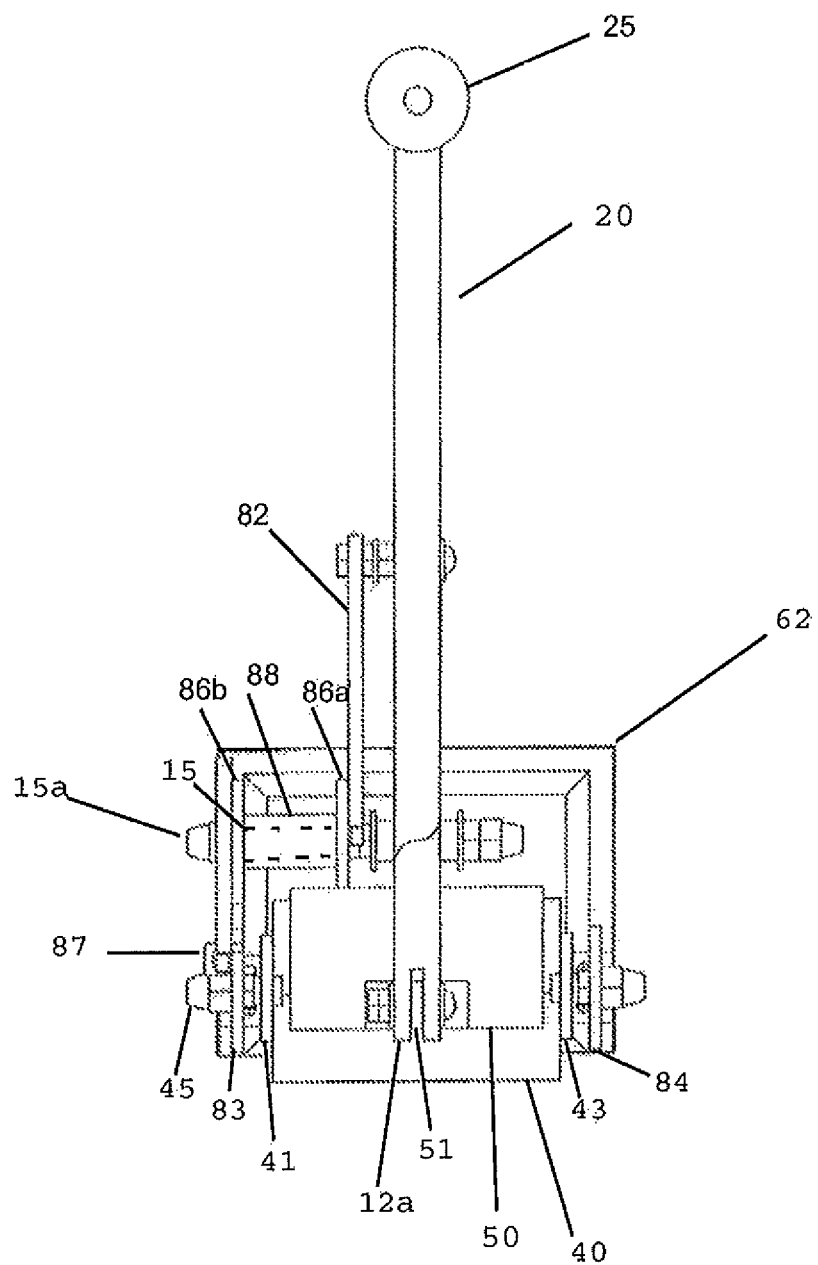
FIG. 4 is a left side plan view of the inventive squeezer in an initial squeezing position.

As shown in FIGS. 2 and 4, the pressing plate jaw 50 is pivotally connected to the bottom end 12a of the first handle 10 via a pivoting pin 51. The pressing plate jaw 50 pivots between a rest position (as shown in FIG. 2) where it faces downward on an angle and a squeezing position (as shown in FIG. 7) where it faces the U-shaped jaw 40. The pressing plate jaw 50 fits between the arms of the 41, 43 of the U-shaped jaw 40 during squeezing the fruit. The pressing plate 50 can have serrated teeth for facilitating grabbing the fruit.

A bar 53, as shown in FIG. 2, pivotally connects the pressing plate jaw 50 to the bottom portion 12 of the first handle 10. The pivotal connection between the pressing plate jaw 50 and the first handle 10 allows the squeezer 1 to accommodate many different sizes of food between the jaws 40, 50.

The pressing plate jaw 50 hangs downward when the squeezer 1 is in a rest position. In order to pick up a food item on a horizontal surface, the squeezer is moved over and downward over the food item so that the food item is fixed between the jaws 40, 50. Squeezing the handles gently will allow the user to pick up the food item without dropping. If the food item is small, the face of the pressing plate jaw 50 will contact only the most outboard portion of the food item and move to a vertical position when the food item is received between the jaws 40, 50 by virtue of the pressing forces between the food and plate 50. The face of the pressing plate 50 rotates to a position that is substantially parallel to the base 42 of the U-shaped jaw 40. If the food item is large, the pressing plate 50 will contact substantial parts of the large food item and rotate toward the U-shaped jaw 40, thereby initially compressing the larger food item more than a smaller food item and locking it more tightly in place as the pressing plate 50 rotates toward its position between the U-shaped jaw 40. As the handles are squeezed closer together, the face of the pressing plate 50 rotates toward a vertical orientation from the original downward facing position. With this arrangement, the same pivoting pressing plate 50 can accommodate a wide range of food item sizes.

The pressing plate jaw 50 can be attached to the bottom of the first handle 10 by other means. In another embodiment, the pressing plate jaw 50 is longitudinally or vertically fixed to the bottom portion 12 of the first handle 10 but capable of sliding laterally toward and/or away from the U-shaped jaw 40 for adjusting the space necessary for receiving and picking up the fruit. The pressing plate jaw 50 is locked in position after the adjustment by a locking pin or other similar device that is received in corresponding openings in the bar 53 and the bottom portion 12 of the first handle 10. The pin extends through the corresponding openings for locking the pressing plate jaw 50 in a lateral position after adjusting the space for the fruit. Still, in another embodiment, the pressing plate jaw 50 is laterally adjusted by a ratchet-type connection to the bottom end 12 of the first handle 10.

Figure 6:
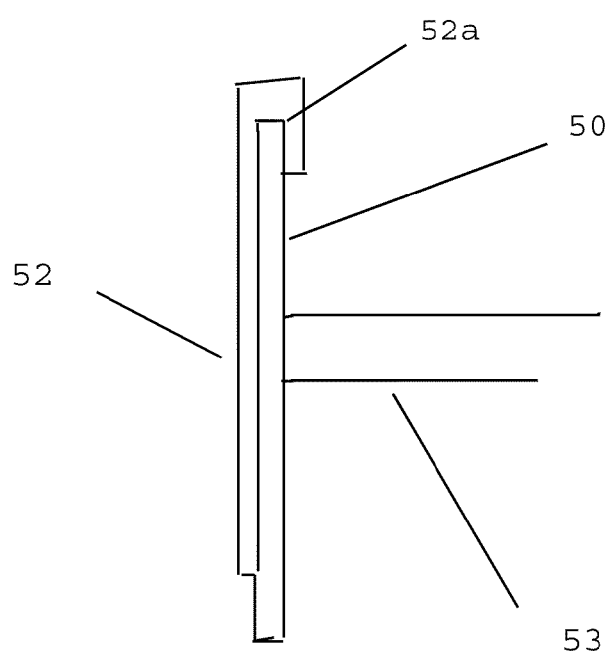
FIG. 6 is a side view of the pressing jaw plate with a removable plate jaw extension of the inventive squeezer.

As shown in FIG. 6, the squeezer of the subject invention includes a removable expansion plate 52 which is mounted to the pressing plate jaw 50. The expansion plate 52 can be set at a plurality of relative positions on the plate jaw 50 for adjusting the foot-print of the pressing plate jaw 50 for various sizes of items to be squeezed. The expansion plate 52 is removably clipped onto the top of the pressing plate jaw 50. The expansion plate 52 has a J-shaped cross section. The top section of the expansion plate 52 has a slot 52a that receives the top portion of the pressing jaw plate 50 and forms a friction fit connection. The expansion plate can be equipped with serrated teeth on its inner surface facing the fruit.

Figure 5:
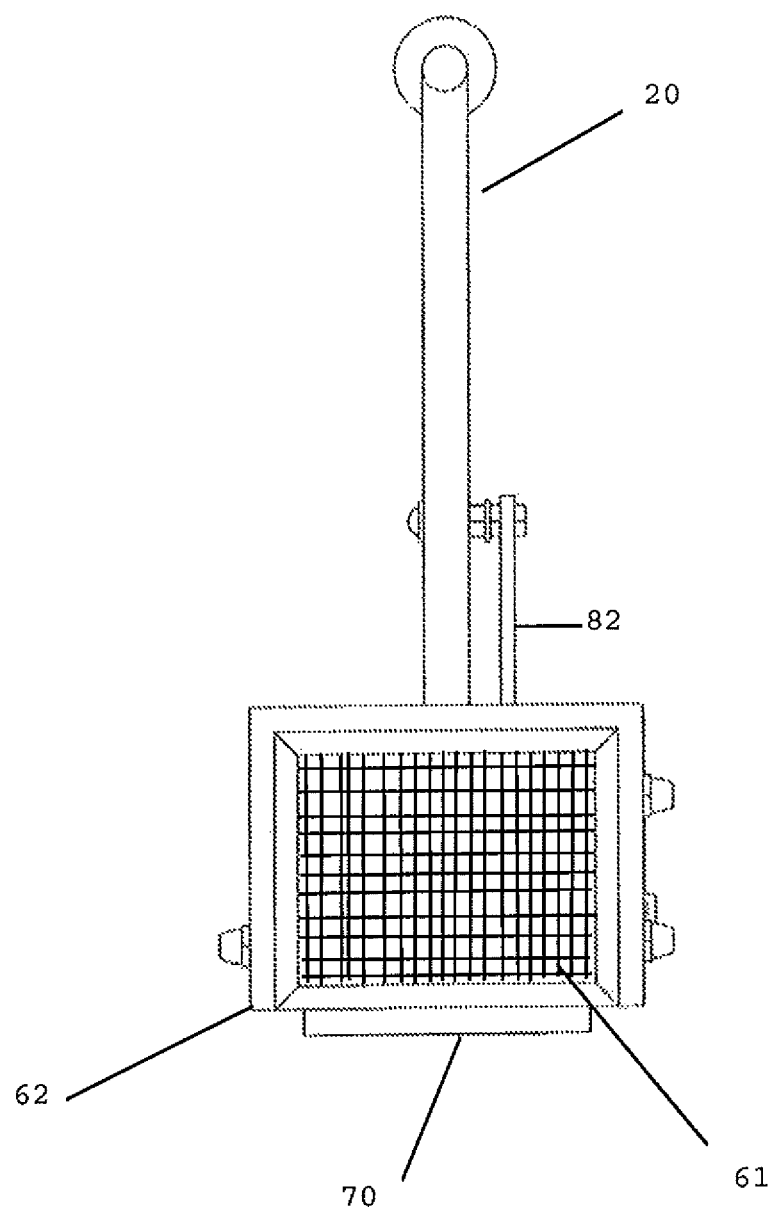
FIG. 5 is right side plan view of the inventive squeezer in an initial squeezing position.

Referring to FIGS. 1, 2 and 5, the screen 60 is pivotally connected to the U-shaped jaw 40. The screen includes a sieve 61, a frame 62 that supports the sieve 61 and at least one bar 63 that operatively connects the frame 62 to the U-shaped jaw 40. Upon pressing the handles 10, 20, the screen 60 rotates from a rest position, where the screen 60 is behind the U-shaped jaw 40, to a screening position, where the screen 60 is below the jaws 40, 50. The screen 60 collects solids, such as pits and pulp, that are squeezed out of and fall from the food item. Upon releasing the handles 10, 20, the screen 60 returns to the rest position.

A wiper blade 70, shown in FIGS. 1 and 2, is connected to the bottom end of the base 42 of the U-shaped jaw 40 and proximate to screen 60. The wiper blade 70 pushes the pits and pulp off of the screen 60 as the screen 60 returns to its resting position from its screening position, thus cleaning the screen in a single motion.

The sieve 61 is mounted on the screen frame 62 in a position to be wiped by the wiper blade. The sieve 61 is curved at a radius of curvature from the second pivot axis and the wiper blade 70 is also curved at that radius of curvature so as to wipe the sieve 61 when the screen 60 is moved. The sieve 61 can also be curved on a radius from the wiper blade that is centered on the second axis and extends to the wiper blade for facilitating wiping of solids from the sieve by the wiper blade as the screen rotates about the second axis.

The link assembly is operatively connected to at least one of the handles 10, 20 so that pressing or releasing the handles 10, 20 moves the screen 60 from its rest position to its squeezing position, or vice versa.

The link assembly includes a link 81 and a crank 83.

The crank 83 is operatively connected to the screen 60 for rotating the screen 60 upon actuation of the handles 10, 20 about the second pivot axis 85. The crank 83 is pivotally connected to the U-shaped jaw 40. A post 45, as shown in FIG. 4, projects from an outer surface of at least one arm 41, 43 of the U-shaped jaw 40. The crank 83 includes an opening (not shown) which receives the post 45. The post 45 extends through the entire thickness of the crank 83. The diameters of the post 45 and crank opening have dimensions that allow the crank 83 to freely turn on the post 45, without sliding off of the post 45. For example, the diameter of the free end of the post 45 is greater than the diameter of the crank opening. Alternatively, a cap can be affixed to the free end of the post 45 to prevent the crank 83 from slipping off of the post 45.

In another embodiment, the crank 83 includes a post that is received in an opening formed in the arm 41, 43 to allow the crank 83 to rotate relative to the U-shaped jaw 40.

The crank 83 can comprise a rotating circular disk connected to the bar 63 of the screen 60 via a nut and screw, or other connector. Alternatively, the crank 83 and the screen frame 62 can be a unitary component that is pivotally mounted on the U-shaped jaw 40, preferably on at least one of the arms 41, 43.

As shown in FIG. 2, the squeezer of the subject invention can include a second disc 84 rotatably mounted at the second pivot axis on an opposite side of the U-shaped jaw 40. The screen arm 63 is connected to the second disc 84.

The first link 81 has a top end 81a and a bottom end 81b, as shown in FIG. 1. The first link 81 is operatively connected to the first handle 10 and the crank 83 at its top end 81a and bottom end 81b, respectively. Actuating the first handle 10 moves the first link 81, which, in turn, rotates the crank 83. Rotation of the crank 83, in turn, moves the screen 60 from a rest position to a screening position, or vice versa.

The bottom end 81b of the first link 81 is connected to the crank 83. A second link, which comprises a U-shaped bar 87, connects the first link 81 to the crank 83. The U-shaped bar 87 includes arms that are received in openings (not shown) in the first link 81 and the crank 83. The U-shaped bar 87 is pivotally connected to the rotating crank disc at a radius that is spaced from the second pivot axis 85. The first axis 18 and the second axis 85 are preferably aligned.

The top end 81a of the first link 81 can be directly connected to the first handle 10 by a screw and nut connection. However, other types of connectors may alternatively be used, such as a rivet. Therefore, movement of the first handle 10 directly translates into movement of the first link 81.

Alternatively, as shown in FIG. 1, the squeezer of the subject invention can also include a spool 86 and a third link 82 for operatively connecting the first link 81 to the first handle 10. As shown in FIGS. 1 and 3, the spool 86 has two ends 86a,b and a hollow cylindrical section 88 which is rotatably engaged with the central pin 15. The ends 86a,b of the spool 86 can comprise circular flanges. The spool 86 rotates relative to the central pin 15. The central pin 15 is received in the hollow cylindrical section 88. As shown in FIG. 4, the central pin 15 has a distal end 15a that is vertically aligned with the post 45 of the U-shaped jaw 40. The distal end 15a of the central pin extends past the open outer end 86b of the spool 86.

A third link 82 is connected at approximately the midpoint of the first handle 10 and at the inner end 86a of the spool 86. The third link 82 acts to trigger the rotation of the screen 60. Squeezing the handles 10, 20 will cause the third link 82 to rotate the spool 86 relative to the pin 15, which, in turn, causes the first link 81 to move. The top end 81a of the first link 81 is fixed to the outer end 86b of the spool 86.

The basic operation of the fruit squeezer 1 is described below.

The user's four fingers are wrapped around the top portion 11 of the first handle 10 and the thumb is wrapped around the top portion 21 of the second handle 20. The heel of the hand is pressed against the second handle 20.

The squeezer 1 is lowered over the fruit. The fruit is preferably cut side down. When the fruit is located between the jaws 40,50, the handles 10, 20 are squeezed toward each other, causing the jaws 40, 50 to grip the fruit. The user then lifts the squeezer 1 with the fruit and places it preferably over a bowl for capturing juice from the squeezed fruit.

Continuing to rotate the handles 10, 20 about the first pivot axis causes the first link 81 to move clockwise, which, in turn, rotates the crank 83 counterclockwise about the second pivot axis. The rotation of the crank 83 causes the screen 60 to rotate from its rest position to its screening position.

Applying additional pressure to the handles 10, 20 causes the jaws 40, 50 to move toward each other and squeeze the fruit. The screen 60 captures pits and pulp that are squeezed out from the fruit, while the juice passes through the screen 60 and pours into a bowl or other juice collector beneath the squeezer.

When the fruit is fully squeezed, user releases pressure on the handles 10, 20. The spring 17 forces the handles 10, 20 away from each other. The first link 81 and crank 83 move in the reverse direction causing the screen 60 to rotate upward from the screening position to the rest position. As the screen 60 rotates upward, wiper 70 wipes the pulp and pits off of the screen 60.

Upon further releasing the handles 10, 20, the jaws 40, 50 move in opposite directions away from the fruit and the fruit drops from between the jaws 40, 50.

The use of the squeezer 1, from picking up the fruit to depositing the squeezed fruit, requires the use of a single hand. Further, the user's hand does not touch the fruit, which helps maintain a clean, healthy environment in the kitchen. The squeezer can be easily cleaned by running water from the faucet on it.

In general, the individual elements of the squeezer can be composed of any material which will provide sufficient strength so that the device will not break when exposed to the stresses of its ordinary use and which will allow the fruit squeezer to accomplish its aforementioned objectives.

While a specific embodiment of the invention has been shown and described in detail to illustrate the application of the principles of the invention, it will be understood that the invention may be embodied otherwise without departing from such principles.

What is claimed is:

1. A method of juicing a fruit, said method comprising the steps of:
    cutting a fruit to yield a cut fruit segment;
    placing a jaw of a squeezing apparatus on a first side of said cut fruit segment and placing a pressing plate of a squeezing apparatus on a second side of said cut fruit segment;
    urging upper handles of said squeezing apparatus to move toward each other, whereby said pressing plate and said jaw accordingly move in a direction toward each other;
    whereby when said jaw and said pressing plate move in a direction toward each other, a screen is automatically moved from a first position substantially parallel to said jaw into a second position below and substantially orthogonal to said jaw.

2. The method of claim 1 comprising the step of urging said upper handles toward each other such that juice is squeezed out of said cut fruit segment.

3. The method of claim 2 further comprising the step of trapping pits with said screen deployed to said second position.

* * * * *